United States Patent [19]

Burton

[11] Patent Number: 4,842,834

[45] Date of Patent: Jun. 27, 1989

[54] PROCESS FOR REDUCING THE CONCENTRATION OF POLLUTANTS IN AN EFFLUENT

[75] Inventor: Albert A. Burton, Norwalk, Conn.

[73] Assignee: Fuel Tech, Inc., Stamford, Conn.

[21] Appl. No.: 9,696

[22] Filed: Feb. 2, 1987

[51] Int. Cl.[4] .......................... C01B 21/00; B01J 8/00
[52] U.S. Cl. .................................... 423/235; 423/239
[58] Field of Search ................... 423/235, 235 D, 239, 423/239 A, 242 A, 242 R

[56] References Cited

U.S. PATENT DOCUMENTS

| | | | |
|---|---|---|---|
| 216,898 | 6/1879 | Salisbury | 239/416 |
| 1,459,295 | 3/1922 | Smith | 239/419.3 |
| 1,624,806 | 1/1923 | Ryder et al. | 239/416 |
| 1,645,787 | 12/1926 | Barnes | 239/417 |
| 1,661,150 | 2/1928 | Birkenmaier | 239/117 |
| 1,671,494 | 3/1925 | Stewart | 239/416 |
| 1,965,465 | 1/1929 | Magowan | 239/132.5 |
| 2,117,270 | 5/1938 | Bloom | 158/110 |
| 2,532,851 | 12/1950 | Meyer | 299/141 |
| 2,935,128 | 5/1960 | Ferguson | 158/106 |
| 3,076,607 | 2/1963 | Cordier | 239/132 |
| 3,443,755 | 5/1969 | Bricmont | 239/132.5 |
| 3,868,211 | 2/1975 | Haye et al. | 431/10 |
| 4,119,702 | 10/1978 | Azuhata et al. | 423/235 |
| 4,452,765 | 6/1984 | Peterson et al. | 423/242 |
| 4,501,722 | 2/1985 | Ashley et al. | 423/242 |
| 4,518,120 | 5/1985 | Johnson | 239/424 |
| 4,551,090 | 11/1985 | Leikert et al. | 431/188 |
| 4,555,059 | 11/1985 | Collins et al. | 239/425 |
| 4,555,996 | 12/1985 | Torbov et al. | 423/242 |
| 4,614,159 | 9/1986 | Sugiura et al. | 110/261 |
| 4,621,492 | 11/1986 | Von Pragenau | 60/492 |

*Primary Examiner*—Gregory A. Heller
*Attorney, Agent, or Firm*—St. Onge Steward Johnson & Reens

[57] ABSTRACT

A process and apparatus for reducing the concentration of pollutants in an effluent from the combustion of a fuel is presented. The process and apparatus enables injection of an effluent treatment fluid at independently variable droplet sizes and distance of injection to a wide variety of distribution patterns within an effluent passage. An atomization conduit, positioned coaxially around a treatment fluid conduit, extends into the effluent and supplies an atomization fluid. The supply conduit is axially slidable with respect to the atomization conduit and supplying a treatment fluid through the supply conduit. The relative axial position of supply conduit and the atomization conduit is adjusted and the rate of flow of the atomization fluid is selected to inject droplets of a size effective to a desired distance within the passage.

9 Claims, 3 Drawing Sheets

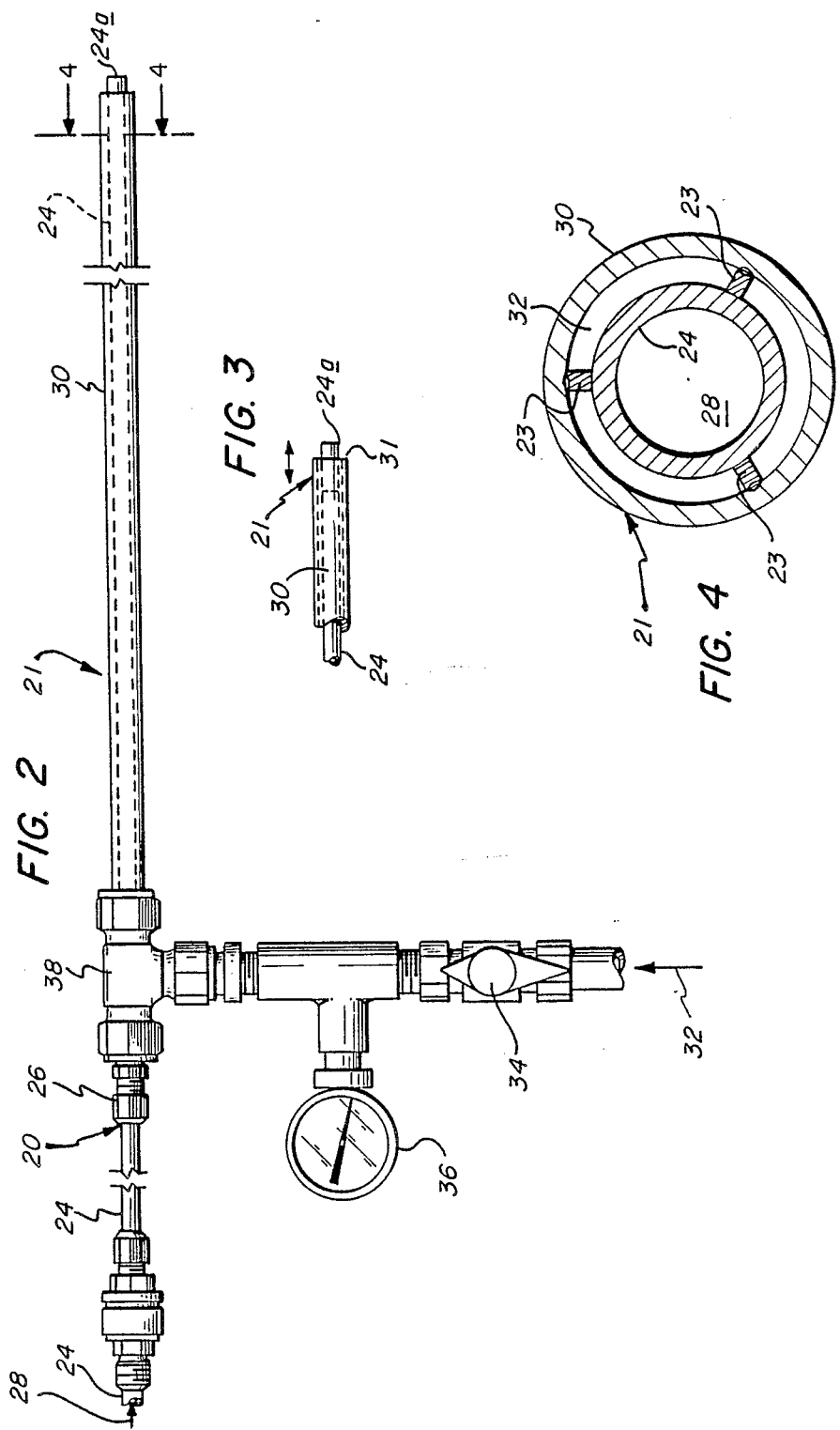

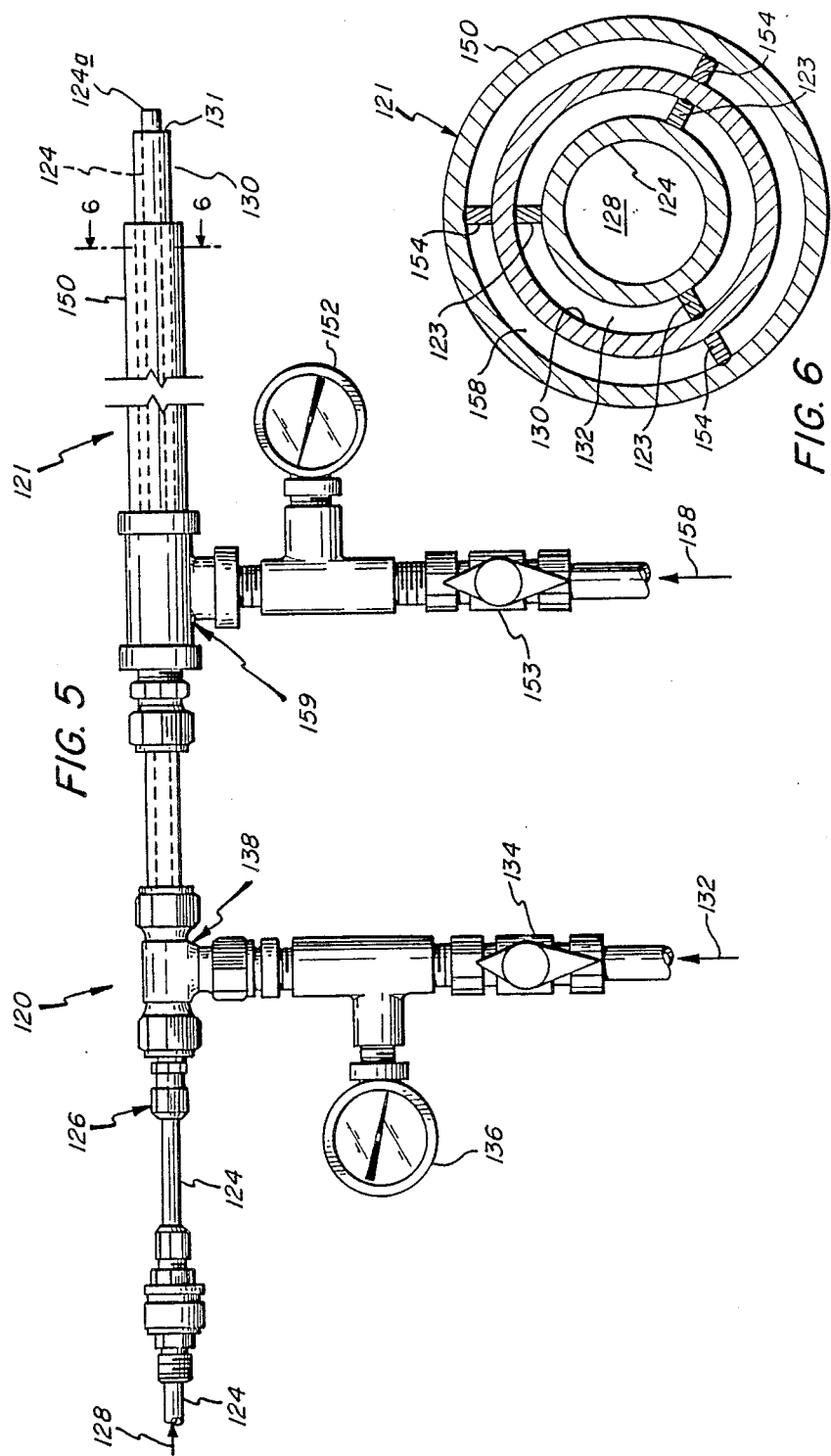

PROCESS FOR REDUCING THE CONCENTRATION OF POLLUTANTS IN AN EFFLUENT

TECHNICAL FIELD

The present invention relates to the reduction of pollutants, such as nitrogen oxides in an effluent, from the combustion of a carbonaceous fuel. More particularly, this invention relates to a process and apparatus therefor.

Carbonaceous fuels can be made to burn more completely, and with reduced emissions of carbon monoxide and unburned hydrocarbons, when the oxygen concentrations and air/fuel ratios employed are those which permit high flame temperatures. By high flame temperatures, it is meant that, for instance, when fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combined as nitrogen oxides ($NO_x$).

Nitrogen oxides, especially NO, are troublesome pollutants which are found in the combustion effluent streams of large utility boilers when fired as discussed above, and comprise a major irritant in smog. It is further believed that $NO_x$ compounds can undergo a process known as photo-chemical smog formation, through a series of reactions, in the presence of sunlight and hydrocarbons. Moreover, nitrogen oxides comprise a major portion of acid rain.

Unfortunately, the high temperatures and relatively hostile environment within a utility boiler make most common methods of reducing $NO_x$ concentrations, such as effluent scrubbing or catalyst grids, uneconomical, unfeasible, or both.

BACKGROUND ART

Many different processes and compositions have been proposed for reducing the nitrogen oxides concentration in an effluent. For instance, in U.S. Pat. No. 3,900,554, Lyon discloses reducing nitrogen monoxide (NO) in a combustion effluent with ammonia and specified ammonia precursors or their aqueous solutions, which are injected into the effluent for mixing with the nitrogen monoxide at a temperature within the range of 1600° F. to 2000° F.

In U.S. Pat. No. 3,961,018, Williamson discloses the purification of acid gas-containing streams at low temperatures approaching ambient by contacting the gas stream with an amine vapor in sufficient concentration such that its partial pressure is at least 5% of the total pressure of the gas stream.

In a somewhat different environment, Goldstein et al., in U.S. Pat. No. 4,061,597, indicate that temperatures within the range of 1000° F. to 1300° F. are effective when using urea for reducing brown fumes caused by nitrogen dioxide ($NO_2$) from catalyst treatment effluents.

In U.S. Pat. No. 4,325,924, Arand et al. disclose that under fuel-rich conditions, aqueous solutions of urea at concentrations of greater than 10%, and preferably greater than 20%, are effective nitrogen oxide reducers at temperatures in excess of 1900° F.

In U.S. Pat. No. 4,208,386 Arand et al. disclose that, for oxygen-rich effluents, the temperature is in the range of 1300° F. to 2000° F. for urea added dry or in aqueous solution. Alkanoic solvents are said to be reducing agents which, like hydrogen, carbon monoxide, etc., are said to enable the effective operating temperature to be lowered to below 1600° F.

In improvements to these prior art processes, Bowers, in copending and commonly assigned U.S. patent application, Ser. No. 784,826, filed Oct. 4, 1985, and copending and commonly assigned U.S. patent application, Ser. No. 811,532, filed Dec. 20, 1985, now U.S. Patent No. 4,751,065 discloses the use of a urea solution, which preferably also comprises hexamethylenetetramine, to reduce the $NO_x$ concentration in the effluent of a carbonaceous fuel. The application of urea in a dilute solution of medium to coarse particle size solution allows the effluent to be treated while at a higher temperature.

In a further variation, copending and commonly assigned U.S. patent application Ser. No. 784,828, filed Oct. 4, 1985, now U.S. Patent No. 4,719,092 to Bowers, discloses injecting an aqueous urea solution containing an oxygenated hydrocarbon to control ammonia concentrations while reducing $NO_x$ in an effluent.

Although the art has provided compositions which are effective at reducing the $NO_x$ concentrations in an effluent while the effluent is still extremely hot, the method and apparatus for injecting the compositions into the effluent remains the subject of an intense search.

The problems facing the successful production of method and apparatus for injecting such compositions into an effluent are many. For instance, the extreme heat of the effluent will readily cause a loss in structural integrity of most nozzles or their supports; when the composition to be injected is a solution, often precipitated solute will collect at the end of the nozzle and can block or clog the nozzle or break off as chunks and damage the interior of the boiler; and the need for variability of droplet size and degree of dispersion when situations require, such as situations where the load of the boiler varies. These problems have not been successfully addressed by the prior art.

There exists a present need, therefore, for an apparatus and a process for injecting a treatment fluid, e.g., an aqueous solution of a $NO_x$ reducing composition into an effluent of the combustion of a carbonaceous fuel, allowing for independent variability of droplet size and spray parameters.

DISCLOSURE OF INVENTION

A process and apparatus for reducing the concentration of pollutants, such as nitrogen oxides, in an effluent from the combustion of a carbonaceous fuel are presented. The process comprises: providing an atomization conduit which extends into the effluent from the combustion of a carbonaceous fuel; providing a supply conduit coaxial with and axially slidable within the atomization conduit; supplying an effluent treatment fluid through the supply conduit to inject the fluid into the effluent; and supplying an atomization fluid through the atomization conduit to effect atomization of the solution and to disperse the solution throughout the effluent.

The apparatus comprises a probe for the supply of an atomized treatment fluid into an effluent from the combustion of a fuel, comprising: (a) an atomization conduit which extends into an effluent from the combustion of a fuel; (b) means for supplying an atomization fluid to said atomization conduit; (c) a supply conduit coaxial with and axially slidable within said atomization conduit; and (d) means for supplying a metered amount of an effluent treatment fluid through said supply conduit to inject said treatment fluid into said effluent; wherein the axial position of said supply conduit in relation to the end of said atomization conduit and the rate of supply of said atomization fluid may be selected to provide droplets of varying sizes and distance of injection of said droplets throughout said effluent.

The axial slidability of the supply conduit, which can be adjusted in concert with the rate of supply of the atomization fluid, provides the independent selection of treatment solution droplet size and allows the adequate dispersal of the treatment fluid throughout the effluent to reduce the concentration of nitrogen oxides in the effluent.

BRIEF DESCRIPTION OF THE DRAWINGS

The present invention will be better understood and its advantages more apparent in view of the following detailed description, especially when read with reference to the appended drawings, wherein:

FIG. 2 is a side elevation view, partially broken away of the apparatus of the present invention wherein the portion of the supply conduit is partially retracted;

FIG. 3 is a partial side elevation view of the apparatus of the present invention wherein the portion of the supply conduit is extended;

FIG. 4 is a front cross-sectional view, taken across line 4—4 in FIG. 2, of the supply and atomization conduits of the present invention;

FIG. 5 is a side elevation view of an alternate embodiment of the apparatus of the present invention; and FIG. 6 is a front cross-sectional view, taken along line 6—6 in FIG. 5, of the embodiment of the apparatus of the present invention illustrated in FIG. 4.

BEST METHOD FOR CARRYING OUT THE INVENTION

Figure 1:
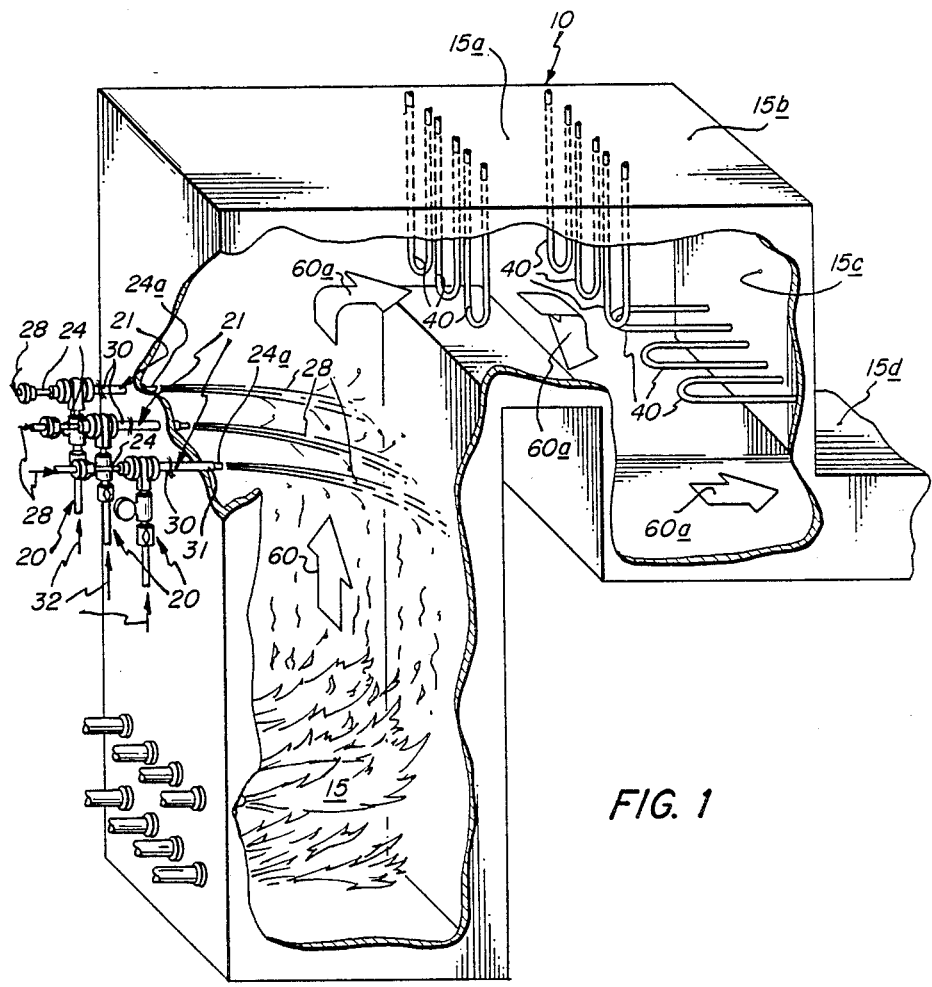
FIG. 1 is an installation schematic in perspective, partially broken away, of the apparatus of the present invention disposed in a utility boiler.

This invention relates to a process and apparatus for reducing the concentration of nitrogen oxides, or other pollutants, in an effluent from the combustion of a carbonaceous fuel. As used herein, the term "front" refers to the end of the apparatus which extends into the effluent; the term "rear" refers to the end of the apparatus from which the fluids and solutions may be supplied. Although this description is written in terms of the reduction of the nitrogen oxides concentration in an oxygen-rich effluent, it will be recognized that the apparatus of the present invention is equally applicable to any situation requiring the injection of an atomized fluid into a high temperature environment. Moreover, it will further be recognized that some or all of the FIGS. are schematic representations for purposes of illustration and do not necessarily depict the actual relative sizes or locations of the elements shown.

As illustrated in FIGS. 1—3 the apparatus 20 of this invention comprises a probe 21 comprising a supply conduit 24 which is operable to supply and inject a treatment fluid 28, such as a solution, into a high temperature environment, such as the effluent stream of a utility boiler 10. Supply conduit 24 may be any suitable conduit for this purpose and is advantageously a seamless tube of a temperature and corrosion resistant material such as a metal, especially temperature-resistant stainless steel. Fluid 28 to be injected through supply conduit 24 is supplied by any conventional supply or pumping device (not shown), as would be familiar to the skilled artisan, and is preferably supplied through a metering device to allow careful control of the amount of fluid injected.

Fluid 28 to be injected typically comprises a solution having at least one additive compound effective in reducing $NO_x$ and/or $SO_x$ under the conditions of injection. It can, however, be a fluidized particulate material. The direction of flow of the effluent is shown by arrows 60. The temperature of the effluent at the point of injection, the concentration of the additive compound in the solution, and the size of the droplets in the dispersion, are selected to achieve reduction in nitrogen oxide or other pollutant levels in the effluent. A preferred embodiment of the invention provides for introducing an aqueous treatment solution, such as urea alone as described in copending and commonly assigned U.S. patent application, Ser. No. 784,826 filed Oct. 4, 1985, or with an enhancer such as hexamethylenetetramine as taught by copending and commonly assigned U.S. patent application, Ser. No. 906,671 filed Sept. 10, 1986, now U.S. Patent No. 4,751,065 the disclosures of which are incorporated herein by reference in their entireties.

The term urea as employed in this description includes the compound urea itself, as well as compounds equivalent in effect. Among the compounds are ammonium carbonate, ammonium formate, ammonium oxalate, ammonium hydroxide and various stable amines, and mixtures of two or more of these or one or more of these with various enhancers. Among the enhancers are compounds selected from the group consisting of guanidine, guanidine carbonate, biguanide, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and hexamethylenetetramine (HMTA). Thus, unless otherwise specified, reference in this disclosure to urea should not be taken as limiting to urea itself but should extend to urea and all of its equivalents. It is pointed out that the term equivalent is not limited to exact equivalents, and various materials within the listing of equivalents will be optimally operable at some conditions which are different than those for others of the listed materials. Moreover, some of the materials may be more effective than others.

Aqueous solutions are typical due to their economy and can be employed with suitable effectiveness in many situations. The effective solutions will vary from saturated to dilute. While water will be an effective solvent for most applications, there are instances where other solvents may be advantageous in combination with water.

Injection is preferably done at a plurality of spaced positions, as illustrated in FIG. 1, and at a distribution of droplet sizes within the range of about 10 to about 10,000 microns Sauter mean diameter. It is an advantage of this invention that wide variations of droplet sizes within this broad range can be achieved along with uniform mixing of the additive compound within the effluent. Droplets can be fine (less than 100 microns), medium (100–500 microns) or coarse (greater than 500 microns) with distance of injection varied from a few feet to as great as 15 feet or more as is required by the particular system. With this degree of flexibility in injection pattern formation and substantially infinite variability of droplet size, it is possible to rapidly and effectively adjust the operation to effluent flows from combustors of widely varying design and conditions of operation. Thus, the injection pattern and distribution of droplet sizes allows uniform dispersion of active material throughout the effluent because some droplets will evaporate immediately adjacent the injection apparatus, while others will survive and release active material on the far side of the boiler or other effluent passage and downstream.

Droplet sizes are determined with a Malvern 2200 instrument, utilizing a Franhofer diffraction, laser-based system. And, unless otherwise indicated, all parts and percentages are based on the weight of the composition at the particular point of reference.

Treatment fluid 28 should be dispersed uniformly within effluent stream 60 at a point where effluent 60 is at a temperature effective for pollutant reduction employing the desired additive at a particular concentration and droplet size. In the exemplary case of droplets of an aqueous, urea solution for $NO_x$ reduction, the temperature will be above about 1300° F. with enhancers, and above about 1550° F. in the absence of enhancers.

As illustrated in FIG. 1, large industrial boilers 10 of the type employed for utility power plants and other large facilities, will typically be water jacketted and have water tubes 40, allowing access only at limited points. In the most typical situation, the interior of boiler 10 can be accessed only in the area of the flame 15 and at an area above the flame, where the temperatures at full load are typically within the range of about 2200° F. to about 2600° F. For boilers operating efficiently with gas, the temperature at these points of access will typically fall within the range of about 2100° F. to about 2600° F., and when fired with coal or oil, will typically fall within the range of about 2050° F. to 2400° F. At these temperatures, the effective introduction of additive compound solutions can be accomplished at lower concentrations of additive in solution and employing dispersions having larger droplet sizes, as disclosed for example in said U.S. patent application Ser. No. 784,826. It will be recognized that some boilers will permit access at positions (designated as 15a, 15b, 15c and 15d) downstream of the flame area, and, therefore, at lower effluent temperatures. At such lower temperatures, the concentration of additive and droplet size should be adjusted as described herein and as would be apparent to the skilled artisan. In fact, if the space into which the apparatus of this invention requires, the end of probe 21 inserted into the boiler can be bent to permit access into a smaller area.

Treatment fluid 28 is preferably injected at a number of spaced positions, as illustrated in FIG. 1, in a manner effective to uniformly form and disperse droplets of fluid 28 within the flowing effluent stream 60 to achieve uniform mixing.

The concentration of the additive compound or compounds within effluent 60 should be sufficient to provide a reduction in nitrogen oxide, sulfur oxide, or other designated pollutant levels. Typically, in the case of urea solution for lowering $NO_x$, the active compound will be employed at a molar ratio of nitrogen in the additive compound to the baseline nitrogen oxide level of about 1:10 to 2:1, and will more preferably be within the range of about 1:4 to 3:2. The exact concentration of this component, however, will depend upon the overall economics of the process, and must further take into account the effect it has on the size of the droplets, the ability to uniformly disperse the droplets, and the life of the droplets within effluent 60 under the high temperature conditions existing therein.

When sulfur-containing fuels are burned, and effluent 60 is treated with urea for $NO_x$ reduction, it is important to reduce the level of ammonia in the final effluent 60a by employing an oxygenated material, especially an oxygenated hydrocarbon, preferably as part of the urea solution as taught in copending and commonly assigned U.S. patent application, Ser. No. 784,828, filed Oct. 4, 1985, now U.S. Patent No. 4,719,092 the disclosure of which is incorporated herein by reference in its entirety. This free ammonia would otherwise react with the sulfur-containing combustion products to produce ammonium sulfate and/or bisulfate which precipitate as a solid and can rapidly reduce the efficiency of the heat exchange apparatus associated with the boiler.

Probe 21 of this invention further comprises an atomization conduit 30, as illustrated in FIG. 3, for supply of an atomization fluid 32. Atomization conduit 30 may be any suitable conduit operable to supply atomization fluid 32 and is advantageously a seamless tube of a temperature resistant material such as a metal, especially temperature-resistant stainless steel. Atomization fluid 32 to be supplied through atomization conduit 30 may be any fluid operable to cause atomization of treatment fluid 28 supplied through supply conduit 24. Typically, atomization fluid 32 is steam or a gas, such as air, which is supplied to atomization conduit 30 from conventional means (not shown) through, illustratively, valve 34 and fitting 38, the flow of which may be measured by gauge 36. Most preferably, atomization fluid 32 is steam. Atomization fluid 32 is advantageously supplied at a velocity sufficient to project at least a portion of the droplets of treatment fluid 28 to a distance of at least about 75% of the width of the flue gas passage at the point of injection, as illustrated in FIG. 1.

Supply conduit 24 is coaxial with and disposed within atomization conduit 30. Further, supply conduit 24 is axially slidable within atomization conduit 30 so that end portion 24a of supply conduit 24 can extend beyond the end 31 of atomization conduit 30, as illustrated in FIGS. 2 and 3, or portion 24a of supply conduit 24 can be retracted into atomization conduit 30, as illustrated in phantom lines in FIG. 3. The axial slidability of supply conduit 24 facilitates the independent control of both atomization, i.e., droplet size, and dispersion of fluid 28 throughout effluent 60, i.e., distance of injection. Both of these, along with the flow pattern of the effluent 60 and its temperature, will determine the degree of mixing of the additive with the effluent. These can readily be optimized for each situation by virtue of the invention. Preferably, supply conduit 24 can be slidably adjusted such that it is retracted into atomization conduit 30 by about 0.5 inches or such that portion 24a of supply conduit 24 extends about 0.5 inches beyond end 31 of atomization conduit 30.

Such axial slidability of supply conduit 24 can be provided by suitable means known to the skilled artisan, such as by compression fitting 26 illustrated in FIG. 2.

Atomization is a function of the force of atomization fluid 32 contacting solution 28 as it exits the front end of supply conduit 24. The force of atomization fluid 32 contacting fluid 28 can be varied by varying the flow of atomization fluid 32 through atomization conduit 30 or by adjusting the length of portion 24a of supply conduit 24 which extends beyond end 31 of atomization conduit 30. For instance, the greater the flow of atomization fluid 32 through atomization conduit 30, the greater the atomization; the shorter the length of portion 24a of supply conduit 24 extending beyond end 31 of atomization conduit 30 or, when end portion 24a of supply conduit 24 is retracted into atomization conduit 30, the greater the atomization.

Similarly, the dispersion of fluid 28 throughout effluent 60 is also a function of the force of atomization fluid 32 contacting fluid 28 as it exits the front end of supply conduit 24. The greater the flow of atomization fluid 32, or the withdrawal of or the shorter the length of portion 24a of supply conduit 24 extending beyond end 31 of atomization conduit 30, the greater the dispersion.

A significant advantage of this invention is the ability to optimize both atomization and dispersion. For example, if lesser atomization, i.e., larger droplet size, yet greater dispersion is desired, the flow of atomization fluid 32 and length of portion 24a of supply conduit 24 which extends beyond end 31 of atomization conduit 30 can be adjusted to provide these two characteristics.

Additionally, the flow of atomization fluid 32 serves to prevent any particles which precipitate from fluid 28 from collecting at the end of supply conduit 24 from where they might otherwise break off as a chunk and cause damage to the inside of boiler 10. The flow of atomization fluid 32 also serves to cool supply conduit 24 to reduce the chances of supply conduit 24 failure due to the high temperature environment of boiler 10.

If desired by the practitioner, as illustrated in FIG. 4, probe 21 of this invention may be provided with alignment tabs 23 to maintain supply conduit 24 centrally disposed within atomization conduit 30. Alignment tabs 23 may be placed intermittently along the length of probe 24 or comprise fins disposed along the entire length of probe 21, although fins are not preferred due to the possibility of their influence on the flow of atomization fluid 32. Alignment tabs 23 are preferably disposed on either the inside of atomization conduit 30, or, more preferably, the outside of supply conduit 24 and are advantageously attached by welding. It is important to note that if alignment tabs 23 are attached to both the inside of atomization conduit 30 and the outside of supply conduit 24, the axial slidability of supply conduit 24 will be prevented.

In an alternate embodiment 120 of this invention, probe 121 is provided with a cooling conduit 150 disposed outside of and around a portion of atomization conduit 130. An appropriate cooling fluid 158, such as air, water or steam, may be circulated or flowed through cooling conduit 150 to maintain the cooling of both atomization and supply conduits 130 and 124 in the high temperature environment of a boiler. Cooling fluid 158 may be supplied to cooling conduit 150 from a suitable source (not shown) through, illustratively, appropriate valve 153 and fitting 159, and measured by gauge 152, as would be familiar to the skilled artisan. As desired, alignment tabs 154 may also be provided between atomization conduit 130 and cooling conduit 150 as illustrated in FIG. 6.

EXAMPLE I

This Example illustrates the reduction of $NO_x$ concentration in an effluent and degree of control of droplet size which may be achieved using the process and apparatus of the present invention.

The burner used is a burner having an effluent flue conduit, known as a flame tube, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, and other compounds of interest present in the effluent. The effluent flue conduit additionally has a thermocouple for temperature measurement. A probe of the present invention having a supply conduit with an outside diameter of about 1/16 inch and an atomization conduit having an outside diameter of about ¼ inch is inserted through a port in the wall of the flame tube at a position adjacent a thermocouple. The probe is inserted such that the atomization conduit extends about 3 inches into the interior of the flame tube.

The burner is fired using number 2 fuel oil at a supply rate of 10.2 lbs/hr. and with an excess of oxygen of 2.5%. The baseline level of $NO_x$ is found to be 182 parts per million (ppm). A treatment fluid is prepared by mixing a solution comprising 50% by weight of urea, 49% by weight of water and 1% by weight of a commercial surfactant, with water to obtain 10% by weight solution of urea. The treatment fluid is supplied through the supply conduit at a rate of 200 ml/hr. at an effluent temperature of 1765° F. The temperature measured 43 inches downstream is 1570° F. and 40 inches further downstream is 1330° F.

To create droplets of about 50 microns or less in size, the supply conduit is adjusted so that its end portion is withdrawn approximately ¼ inch from the end of the atomization conduit, and the flow of air, used as atomization fluid, is set at 45 standard liters per minute.

The droplet sizes are measured with a similar apparatus but outside of the flame tube and without the surfactant. The results are shown in Table 1.

TABLE 1

| Size (Microns) | % Under* | % In Band** |
|---|---|---|
| 100.0 | 100.0 | 0.0 |
| 95.9 | 100.0 | 0.3 |
| 82.7 | 99.7 | 3.8 |
| 71.4 | 95.9 | 2.5 |
| 61.6 | 93.4 | 0.0 |
| 53.1 | 93.4 | 4.1 |
| 45.8 | 89.4 | 7.1 |
| 39.5 | 82.2 | 14.0 |
| 34.1 | 68.2 | 22.3 |
| 29.4 | 45.9 | 17.9 |
| 25.4 | 28.0 | 10.0 |
| 21.9 | 18.0 | 8.7 |
| 18.9 | 9.2 | 5.6 |
| 16.3 | 3.6 | 2.5 |
| 14.1 | 1.2 | 0.7 |
| 12.1 | 0.4 | 0.0 |
| 10.5 | 0.4 | 0.0 |
| 9.0 | 0.4 | 0.0 |
| 7.8 | 0.4 | 0.0 |
| 6.7 | 0.4 | 0.0 |
| 5.8 | 0.4 | 0.0 |

*Refers to the percentage of droplets which are measured as having a size below the indicated size.
**Refers to the percentage of droplets which are measured as having a size between the indicated size and the next lower size.

It will be seen that 93.4% of the droplets produced are below 53.1 microns in size.

The effluent $NO_x$ concentration measured after treatment as described is 97 ppm, a reduction in $NO_x$ concentration of 46.7%.

While a preferred embodiment of the present invention has been described above and illustrated in the accompanying drawings, it is understood that other embodiments are within the contemplation of the inventor and the invention is not limited to the embodiments shown.

I claim:

1. A process for reducing the concentration of nitrogen oxides in an effluent from the combustion of a carbonaceous fuel, the process comprising:
    (a) providing an atomization conduit which extends into the effluent;
    (b) providing a supply conduit coaxial with and axially slidable within said atomization conduit;
    (c) supplying an effluent treatment fluid effective to reduce nitrogen oxides through said supply conduit; and
    (d) supplying an atomization fluid through said atomization conduit to effect atomization of said treatment fluid and to disperse said treatment fluid throughout the effluent, wherein the slidable adjustment of said supply conduit and the rate of supply of said atomization fluid are selected to provide droplets of a size effective to achieve reduction of nitrogen oxides in the effluent and to disperse said droplets throughout a substantial portion of said effluent.

2. A process according to claim 1 wherein said fluid comprises as additive urea in amounts sufficient to provide a molar ratio of urea to nitrogen oxides of about 1:4 to about 5:1.

3. A process according to claim 1 wherein the temperature of the effluent is above about 1700° F.

4. A process according to claim 2 wherein said urea solution is injected into the effluent at a temperature of about 2000° F. to about 2500° F.

5. A process according to claim 1 wherein the slidable adjustment of said supply conduit and the rate of supply of said atomization fluid are selected to provide droplets within the range of about 10 to about 10,000 microns Sauter mean diameter.

6. A process according to claim 5 wherein said atomization fluid comprises steam.

7. A process according to claim 6 which further comprises providing a cooling conduit coaxial with and disposed around said atomization conduit.

8. A process according to claim 7 wherein said cooling conduit is supplied with a cooling fluid.

9. A process according to claim 8 wherein said cooling fluid is air, steam or water.

* * * * *